United States Patent [19]

Betz et al.

[11] 4,197,319

[45] Apr. 8, 1980

[54] FEED INTAKE LIMITING COMPOSITION FOR RUMINANTS

[75] Inventors: Norman L. Betz, St. Louis; Robert L. Seibert, Cuba, both of Mo.

[73] Assignee: Ralston Purina Company, St. Louis, Mo.

[21] Appl. No.: 850,501

[22] Filed: Nov. 10, 1977

[51] Int. Cl.$^2$ ............................................. A23K 1/00
[52] U.S. Cl. ................................. 426/2; 426/69; 426/74; 426/623; 426/635; 426/646; 426/651; 426/807
[58] Field of Search ............... 426/2, 74, 69, 651, 426/600, 629, 623, 630, 646, 635, 636, 807

[56] References Cited

U.S. PATENT DOCUMENTS

| | | | |
|---|---|---|---|
| 2,323,466 | 7/1943 | Griffith | 426/651 |
| 2,385,412 | 9/1945 | Hall | 426/651 X |
| 2,921,853 | 1/1960 | Card et al. | 426/651 X |
| 3,669,676 | 6/1972 | Karr et al. | 426/74 |

OTHER PUBLICATIONS

Hackh "Chemical Dictionary" McGraw Hill Publishers Fourth Edition 1969 p. 472.
Morrison "Feeds & Feeding" Morrison Publishing Company 1957 pp. 451-452.

*Primary Examiner*—R. B. Penland
*Attorney, Agent, or Firm*—Virgil B. Hill

[57] ABSTRACT

An improved composition has been developed to effectively and efficiently limit protein or feed supplement intake to a prescribed amount in ruminants when added to the supplement and which in turn allows self-feeding of the supplement. The composition contains diammonium phosphate and/or ammonium sulfate, meat meal and oleoresin capsicum.

16 Claims, No Drawings

FEED INTAKE LIMITING COMPOSITION FOR RUMINANTS

BACKGROUND OF THE INVENTION

This invention relates to a feed intake limiting composition for cattle and a process for employing the same to attain an economical and efficient means of self-feeding cattle.

In the feeding of animals on pasture, particularly cattle, it is often very advantageous from the standpoint of economics, as well as convenience, for the cattle to be self-fed, which means that the cattle are offered a feed or feed supplement on a free choice basis without periodic feedings of a rationed amount by a farmer or rancher each day. A disadvantage, however, of self-feeding animals such as cattle is that the animals tend to over-eat feed supplements and consequently get a higher intake of feed or feed supplement that is completely necessary for proper weight gain or weight maintenance and some don't get any as a result. This results in an additional expense to the rancher having to provide additional and unnecessary amounts of protein or feed supplement to be fed in combination with a roughage source such as grass or hay or feed individually.

It is, therefore, desirable to limit the intake of the protein or feed supplement to an amount which is the proper amount needed for proper weight gain or weight maintenance without consumption of more than is needed by the animal. As noted on page 699 of Morrison, Feeds and Feeding (1956), the prior art has incorporated salt or gypsum in the protein or feed supplement in order to control consumption of the protein supplement to a prescribed amount. A disadvantage, however, in employing either one of these compounds to control consumption of the protein supplement and accordingly provide an effective self-feeding feed composition is that both materials provide little nutritional value and require mixing in large quantities with the supplement in order to reduce consumption thereof. For example, 1 part of salt to 3 parts of protein or feed supplement will ordinarily be required to reduce daily consumption in cattle to the desired amount. Another disadvantage of employing these materials is that salt poisoning of the animals may occur if water is not readily or freely available.

One intake limiting composition to overcome these problems was disclosed in U.S. Pat. No. 3,669,676 on June 13, 1972. However, that composition required the use of fish oil in feed limiting amounts.

SUMMARY OF THE INVENTION

We have, therefore, developed a composition which has been found to be highly effective in eliminating feed or protein supplement intake by cattle to a desired and predetermined amount which is also considered necessary for proper weight maintenance. We have also been able to develop a composition for the foregoing purpose which permits the complete elimination of fish oil and which is flexible enough to operate with either diammonium phosphate or ammonium sulfate or both depending upon the needs of the consumer. The composition does not require feeding in a large quantity and accordingly becomes both a convenient and economical means of limiting protein or feed supplement intake in cattle when incorporated in the protein or feed supplement. It furthermore does not require free access to water as does gypsum or salt which has been used by the prior art to control intake thus overcoming a serious disadvantage of the prior art.

The composition we have developed is a mixture of meat meal, ammonium sulfate and/or diammonium phosphate, and an oleoresin which is added in combination with a roughage source such as grass or hay. The combination of these materials contribute to and provide nutrient requirements for the feed supplement when incorporated therein, besides effectively limiting intake of the feed supplement to a prescribed amount. For example, meat meal is an effective and available source of protein. The diammonium phosphate and/or ammonium sulfate likewise are used to meet the sulfur and/or phosphorus requirements of the cattle besides providing some contribution as non-protein nitrogen sources which may be effectively converted to organismal protein by ruminants.

It is, therefore, an object of the present invention to provide a composition which consists of components which add to the nutrient requirements of a feed supplement, which in combination effectively limit feed supplement intake to a prescribed amount to allow self-feeding of cattle.

Also, an object of the present invention is to provide for a method of limiting intake of cattle by administration of a composition which comprises various materials meeting nutrient requirements of the cattle which have been found in combination to effectively limit supplement intake and provide a method for self-feeding of the protein feed supplement in combination with a roughage source.

DESCRIPTION OF THE PREFERRED EMBODIMENTS

In accordance with the present invention the composition we have developed comprises a unique combination of materials which provide various nutritional factors while at the same time render the supplement undesirable in taste and/or odor and accordingly limit supplement consumption to minimum predetermined amount which is necessary for proper weight maintenance. The predetermined amount of supplement consumption or intake for cattle will accordingly vary, depending on the type of animals and the environmental conditions under which they are maintained, although it may generally be considered that an average preferred feed intake for protein supplement will vary from about 2 to 8 pounds per head of cattle per day. This amount of intake will generally be the minimum amount which is necessary for proper weight maintenance and most efficient feed utilization. Accordingly, it is preferable in a self-feeding program to attain a balanced protein supplement intake limited to from 2 to 8 pounds per head per day.

The protein or feed supplement with which the intake limiting composition of the present invention may be employed may be any feed or protein material generally intended to meet the full nutritional requirements of the animal with exceptions of, as in the case of cattle, the various roughage sources which are considered necessary for proper feed utilization. Accordingly, the protein supplement may consist of various farinaceous and proteinaceous materials such as vegetable proteins among which are the oil seed materials such as soybeans, cottonseed and peanuts. These are considered to be highly utilizable and available sources of protein for animals. Likewise, various farinaceous materials which additionally contribute to the protein requirement of the feed supplement may also be added; among these are such grains as corn, milo, alfalfa, or various wheat materials or wheat by-products.

If desired, the feed supplement may additionally contain various non-protein nitrogen materials such as urea or biuret which ruminant animals specifically are able to efficiently utilize and convert to organismal protein. This provides a cheap and effective source of nitrogen in a ruminant diet.

The protein or feed supplement typically contains various minerals considered essential for proper weight maintenance of animals such as cattle. Various vitamins, either fat or water soluble, will also be typically added to achieve complete nutritional balance. Among these are the fat soluble vitamins such as A, D, E as well as numbers of the B vitamin groups among which are $B_1$, $B_2$, $B_6$ and $B_{12}$.

The protein or feed supplement which may be used in the present invention may also typically contain various medicaments or additives either for the purpose of disease control or for improving weight maintenance of the animals. Such additives or medicaments are for example antibiotics, bacteriostats and hormones.

For the most effective results, a protein supplement will be fed in combination with various cellulosic roughage sources such as grass, hays or silage. The present invention is not intended to be limited insofar as the use of any specific roughage sources which are used in combination with the protein or feed supplement containing the intake limiting composition are concerned. The particular roughage sources are generally dictated by local availability of various forage crops.

The oleoresins of this invention are a natural combination of resins and essential oils occuring in and exuded from various plant sources and particularly the spices such as hot sauces, red pepper, black pepper, ginger, caraway, cinnamon, garlic, oregano and clove. Such oleoresins are called for example, capsicum, aspidium, cubeb, luperlin, ginger, parsley and pepper. The use of oleoresin capsicum is particularly preferred for the purposes of this invention and as such will be used to describe the detailed embodiments of this invention. Oleoresin serves as a complete substitute for fish oil in previous intake limiting compositions. It is used in an amount of at least about 0.1% by dry weight of the final supplement which consists of normal feed ingredients plus oleoresin, meat meal, diammonium phosphate and/or ammonium sulfate and other materials herein before described except the roughage source. Preferably, the oleoresin is present in an amount of from about 0.1% to about 0.5% on the above weight basis. It is especially preferred from 0.17% to 0.33% oleoresin. The amount of oleoresin may be varied within the prescribed range stated to achieve the preferred feed intake level of from 2 to 8 pounds per head per day.

The feed intake limiting composition will also contain sufficient ammonium sulfate so that the feed or protein supplement to which the composition is added will contain between about 0.1-5% by weight of ammonium sulfate, although preferably the amount of ammonium sulfate may be varied between 1 and 4% to also achieve the preferred intake limitation of 3-8 pounds of supplement per head per day when used in combination with the preferred amounts of the other ingredients of the intake limiting composition. The type of ammonium sulfate which may be employed in the present invention may be generally of any type considered suitable for feed use and being of sufficient purity to not have any deleterious effect on the animal.

The feed intake limiting composition of the present invention will also contain sufficient ammonium phosphate so that the feed or protein supplement to which the composition is added will contain between about 0.1-5% by weight of diammonium phosphate; also preferably the amount of diammonium phosphate may be varied between 2 and 5% to also achieve the preferred intake limitation of 3-8 pounds of supplement per head per day when used in combination with the preferred amounts of the other ingredients of the intake limiting composition. Likewise, the present invention is not limited on the type or purity of diammonium phosphate which may be employed and any source of this material considered suitable for feed use may be employed in the present invention. It is important to note that the oleoresin permits elimination of either the phosphate or sulfate if desired while still maintaining a feed intake limitation within the prescribed range. However, it is preferred for both nutritional and intake limitation reasons that both ingredients be utilized.

The intake limiting composition will also contain as an ingredient, meat meal or an equivalent, dried or ground meat scraps of meat by-products in such an amount so that the feed or protein supplement to which the composition is added will contain between about 0.1-20% by weight of meat meal; also preferably the amount of meat meal may be varied between 3-17% by weight to also achieve the preferred intake limitation of 3-8 pounds per head per day when used in combination with the preferred amounts of other ingredients of the intake limiting composition.

The intake limiting composition which combines a mixture of meat meal, diammonium phosphate and/or ammonium sulfate and oleoresin may be added to a protein or feed supplement to limit the intake of the same, and accordingly said protein supplement will be typically administered or fed to cattle in combination with a roughage or forage source. The protein or feed supplement containing the intake limiting composition may be fed in any manner or form considered to be suitable for feeding animals such as cattle. For example, the protein or feed supplement containing the intake limiting composition may be formed into pellets or cubes and fed in this form or it may be compressed into large blocks and offered free choice to cattle grazing on a pasture or range. It is preferred, however, to feed or administer the protein or feed supplement containing the intake limiting composition in meal or mash form in such a manner that the cattle have free and ready access to it. While the present invention is not to be limited to any particular theory of operation, feeding the supplement with the composition in meal or mash form apparently attains somewhat more effective results than when the composition is used in the form of cubes or pellets as well as range blocks. It may be theorized, therefore, that the undesirable taste of the intake composition of the present invention is more readily apparent to the cattle when fed in a meal form. Additionally, it should be noted that feeding the composition wet or with from 5 to 20% added moisture by weight based upon the weight of the supplement also provides excellent results.

As previously noted, the intake limiting composition we have developed is desirable because it requires feeding at low amounts to limit intake as well as being composed of materials which contribute to the nutritional balance of the protein supplement, while on the other hand the combination of materials effectively control daily consumption of the protein or feed supplement to a predetermined amount which is considered the minimum amount necessary for weight maintenance of the animal. This in turn allows the supplement to be efficiently self-fed to cattle with consumption of only the minimum amount as is necessary without over-eating or otherwise wasting the supplement.

EXAMPLE 1

Fifteen cross-bred cows averaging 1,000 pounds in weight and consuming approximately 18 pounds per head per day of the control feed supplement prior to addition of the intake limiting composition of the present invention were used to determine intake reduction from the composition of this invention. For a period of 6 weeks these animals were free-choice fed on drylot with a supplement consisting of the following ingredients:

Table I

| Ingredient | Pounds |
| --- | --- |
| $CaCO_3$ | 29.2 |
| Grain Milo | 1425 |
| Dehy. Alfalfa | 100 |
| Salt | 100 |
| Urea | 19.8 |
| Vitamin A Premix (10,000) | 1.29 |
| Trace Minerals | 1 |
| Vitamin D (20) | .2 |
| Vitamin E | .2 |
| Santoquin | .38 |

The supplement included the following feed limiting materials:

Table II

| Ingredient | Percent by Weight |
| --- | --- |
| Meat Meal | 12 |
| Diammonium Phosphate | 2.4 |
| Ammonium Sulfate | 2.0 |
| Oleoresin Capsicum | 0.30 |

The feed supplement with the intake limiting composition in meal form was offered free choice to the cattle for this period in combination with 15–23 pounds native grass hay per day and it was found that during the period of this test, a feed supplement consumption or intake was effectively reduced in all cows to an average of about 3.8 pounds per head per day as compared to a general average of about 18 pounds per head per day prior to adding the present intake limiting composition. All of the cattle on the present test maintained their weight for the period involved.

It can be readily seen that the feed intake limiting composition effectively reduced consumption to the desired amount, enabling the cattle to be self-fed for a period in question (while still adequately maintaining their weight).

EXAMPLE 2

A test was run in accordance with Example 1 except that only 6 cows were used for a period of only 3 days and the ammonium sulfate was taken out of the mixture. Nevertheless, the feed intake was still reduced to 5.4 pounds per head per day (while the cattle maintained their weight).

EXAMPLE 3

A test was run in accordance with Example 2 except that the ammonium sulfate was left in the mixture and the diammonium phosphate was taken out. The feed intake was reduced to 6.3 pounds per head per day while the cattle maintained their weight.

EXAMPLE 4

A test was run in accordance with Example 1 except that a period of 5 days was used and 8% water was added to the supplement.

The intake was reduced to 2 pounds per head per day with good weight maintenance.

Example 5

A series of tests were run on the same supplement but with oleoresins other than oleoresin capsicum. The results appear in Table III.

Table III

| Source of Oleoresin | Amount (%) of Supplement | No. of Cows | Length of Test (Days) | Consumption Supplement (# Head/Day) | Normal Consumption (# Head/Day) |
| --- | --- | --- | --- | --- | --- |
| Black Pepper | .33% | 6 | 3 | 7.0 | 18 |
| Ginger | .33% | 6 | 3 | 5.8 | 18 |
| Caraway | .33% | 6 | 3 | 7.0 | 18 |
| Cinnamon | .33% | 6 | 3 | 7.6 | 18 |
| Garlic | .33% | 6 | 3 | 5.1 | 18 |
| Oregano | .33% | 6 | 3 | 6.1 | 18 |

Note that 12.0% meat meal, 2.4% diammonium phosphate and 2.0% ammonium sulfate were present in each test of example 5.

What is claimed is:

1. A feed supplement containing an intake limiting composition, said supplement comprising grain, said intake limiting composition being present in an amount effective to limit intake and comprising meat meal; a salt selected from the group consisting of ammonium sulfate, diammonium phosphate and combinations thereof, and oleoresin capsicum.

2. The feed supplement of claim 1 wherein the amount of said oleoresin is at least about 0.1% by weight of the supplement.

3. The feed supplement of claim 2 wherein the amount of said oleoresin is from about 0.1% to about 0.5%.

4. The feed supplement of claim 2 wherein the amount of said oleoresin is from about 0.17% to about 0.33%.

5. The feed supplement of claim 2 wherein the amount of said oleoresin is from about 0.3% to about 0.33%.

6. The feed supplement of claim 1 wherein the supplement contains 5 to 20% added moisture by weight of the supplement.

7. A feed intake limiting composition for use in limiting the consumption of a feed supplement, fed free-choice to cattle, said composition comprising amounts effective to limit intake of said supplement of a salt selected from the group consisting of ammonium sulfate, diammonium phosphate and mixtures thereof; meat meal; and oleoresin capsicum.

8. The composition of claim 7 wherein the amount of said oleoresin is at least about 0.1% by weight of the supplement.

9. The composition of claim 8 wherein the amount of said oleoresin is from about 0.1% to about 0.5%.

10. The composition of claim 8 wherein the amount of said oleoresin is from about 0.17% to about 0.33%.

11. The product claim 8 wherein the amount of said oleoresin is from about 0.3% to about 0.33%.

12. A method for limiting the intake of feed supplements comprising feeding an intake limiting composition with the supplement in an amount effective to limit intake of the supplement, said composition comprising meat meal; a salt selected from the group consisting of ammonium sulfate, diammonium phosphate and mixtures thereof; and oleoresin capsicum.

13. The method of claim 12 wherein the amount of oleoresin capsicum is from about 0.1–0.33% by weight of the supplement.

14. The method of claim 12 wherein the amount of oleoresin capsicum is from about 0.3–0.33%.

15. The method of claim 12 wherein the supplement contains 5 to 20% added water by weight of the supplement.

16. The method of claim 12 wherein the amount of oleoresin capsicum is between about 0.1 to 0.5% by weight of the supplement.

* * * * *